US012603027B2

(12) United States Patent
Xu et al.

(10) Patent No.: US 12,603,027 B2
(45) Date of Patent: Apr. 14, 2026

(54) DISPLAY PANEL AND DRIVING METHOD THEREOF, AND DISPLAY APPARATUS

(71) Applicants: Visionox Technology Inc., Kunshan (CN); Hefei Visionox Technology Co., Ltd., Hefei (CN)

(72) Inventors: Fengying Xu, Kunshan (CN); Ying Shen, Hefei (CN); Xinquan Chen, Kunshan (CN); Wenquan Chu, Hefei (CN)

(73) Assignees: Visionox Technology Inc., Kunshan (CN); Hefei Visionox Technology Co., Ltd., Hefei (CN)

( * ) Notice: Subject to any disclaimer, the term of this patent is extended or adjusted under 35 U.S.C. 154(b) by 0 days.

(21) Appl. No.: 18/964,684

(22) Filed: Dec. 2, 2024

(65) Prior Publication Data

US 2025/0095528 A1 Mar. 20, 2025

(30) Foreign Application Priority Data

Dec. 21, 2023 (CN) ......................... 202311776351.7

(51) Int. Cl.
*G09G 3/00* (2006.01)
*G09G 3/32* (2016.01)
*G09G 3/3266* (2016.01)

(52) U.S. Cl.
CPC ............... *G09G 3/035* (2020.08); *G09G 3/32* (2013.01); *G09G 3/3266* (2013.01); (Continued)

(58) Field of Classification Search
CPC ............... H10K 59/131; H10K 77/111; H10K 2102/311; H10K 59/12; H10D 86/60; (Continued)

(56) References Cited

U.S. PATENT DOCUMENTS

2005/0231494 A1* 10/2005 Kumada .............. G09G 3/3666 345/204
2010/0188375 A1* 7/2010 Lee ...................... G09G 3/3266 345/204

(Continued)

FOREIGN PATENT DOCUMENTS

CN 100414359 C 8/2008
CN 103778854 A 5/2014

(Continued)

*Primary Examiner* — Sujit Shah
(74) *Attorney, Agent, or Firm* — Kilpatrick Townsend & Stockton LLP

(57) ABSTRACT

The present application discloses a display panel and a driving method thereof, and a display apparatus. In the display panel, the data lines run through a first display area and a second display area; each of the data lines include a first segment and a second segment, the first segment is located in the first display area, and the second segment is located in the second display area, and the first segment and the second segment are connected by a first switching element; a first gate driving circuit is configured to drive the first display area, the second gate driving circuit is configured to drive the second display area, the first gate driving circuit receives a first trigger signal, and the second gate driving circuit receives a second trigger signal.

20 Claims, 4 Drawing Sheets

(52) U.S. Cl.
CPC ................. *G09G 2300/026* (2013.01); *G09G 2300/0842* (2013.01); *G09G 2310/08* (2013.01)

(58) Field of Classification Search
CPC ......... H10D 86/441; G09G 2300/0426; G09G 3/3233; G09G 2380/02; G09G 2310/0262; G09G 3/035; G09G 3/3275
See application file for complete search history.

(56) References Cited

U.S. PATENT DOCUMENTS

| | | | | |
|---|---|---|---|---|
| 2022/0101794 | A1* | 3/2022 | Kim | G09G 3/3233 |
| 2022/0180782 | A1* | 6/2022 | Nishio | G09F 9/30 |

FOREIGN PATENT DOCUMENTS

| | | | |
|---|---|---|---|
| CN | 111613173 | A | 9/2020 |
| CN | 111613182 | A | 9/2020 |
| CN | 112562570 | A | 3/2021 |
| CN | 112764590 | A | 5/2021 |
| CN | 109637417 | B | 8/2021 |
| CN | 115237361 | A | 10/2022 |

* cited by examiner

DISPLAY PANEL AND DRIVING METHOD THEREOF, AND DISPLAY APPARATUS

CROSS-REFERENCE TO RELATED APPLICATIONS

This application claims priority to Chinese Patent Application No. 202311776351.7, titled "DISPLAY PANEL AND DRIVING METHOD THEREOF, AND DISPLAY APPARATUS" and filed on Dec. 21, 2023, which is hereby incorporated by reference in its entirety.

TECHNICAL FIELD

The present application relates to the field of display technology, specifically to a display panel and a driving method thereof, and a display apparatus.

BACKGROUND

Organic light emitting displays (OLEDs) and flat display apparatuses based on light emitting diode (LED) technology are widely used in various consumer electronics such as mobile phones, televisions, laptops, and desktop computers and have become the mainstream of display apparatuses due to their advantages of high image quality, power saving, thin body, and wide application range.

However, the process performance of current display products needs to be improved.

SUMMARY

Embodiments of the present application provide a display panel and a driving method thereof, and a display apparatus, which can lower the cost of a display product, thereby improving the process performance of the display product.

In a first aspect, an embodiment of the present application provides a display panel, including: a first display area and a second display area; a plurality of data lines running through the first display area and the second display area, each of the data lines includes a first segment and a second segment, the first segment is located in the first display area, the second segment is located in the second display area, and at least one first switching element, the first segment and the second segment are connected by the first switching element; and at least one first gate driving circuit and at least one second gate driving circuit, the first gate driving circuit is configured to drive the first display area, the second gate driving circuit is configured to drive the second display area, the first gate driving circuit receives a first trigger signal, and the second gate driving circuit receives a second trigger signal; where the data lines, the first gate driving circuit, and the second gate driving circuit can be connected to a display driving chip, and the display driving chip is configured to provide the first trigger signal to the first gate driving circuit and provide the second trigger signal to the second gate driving circuit.

In one possible embodiment of the first aspect, in an $i^{th}$ frame, the first scan trigger signal has an enable level, and the first light emitting trigger signal has the enable level; the second scan trigger signal remains at a non-enable level, and the second light emitting trigger signal remains at the non-enable level;

in an $(i+1)^{th}$ frame, the first scan trigger signal has the enable level, and the first light emitting trigger signal has the enable level; the second scan trigger signal has the enable level, and the second light emitting trigger signal has the enable level; and preferably, the first switching element is turned on in the $i^{th}$ frame and the $(i+1)^{th}$ frame.

In one possible embodiment of the first aspect, in a $j^{th}$ frame, the first scan trigger signal has an enable level, and the first light emitting trigger signal has the enable level; the second scan trigger signal has the enable level, and the second light emitting trigger signal has the enable level;

in a $(j+1)^{th}$ frame, the first scan trigger signal has the enable level, and the first light emitting trigger signal remains at a non-enable level; the second scan trigger signal has the enable level, and the second light emitting trigger signal has the enable level;

in a $(j+2)^{th}$ frame, the first scan trigger signal remains at the non-enable level, and the first light emitting trigger signal remains at the non-enable level; the second scan trigger signal has the enable level, and the second light emitting trigger signal has the enable level; and preferably, the first switching element is turned on in the $j^{th}$ frame and the $(j+1)^{th}$ frame, and the first switching element is turned off in the $(j+2)^{th}$ frame.

In one possible embodiment of the first aspect, in a $k^{th}$ frame, the first scan trigger signal has an enable level, and the first light emitting trigger signal has the enable level; the second scan trigger signal remains at a non-enable level, and the second light emitting trigger signal remains at the non-enable level;

in a $(k+1)^{th}$ frame, the first scan trigger signal has the enable level, and the first light emitting trigger signal remains at the non-enable level; the second scan trigger signal has the enable level, and the second light emitting trigger signal has the enable level;

in a $(k+2)^{th}$ frame, the first scan trigger signal remains at the non-enable level, and the first light emitting trigger signal remains at the non-enable level; the second scan trigger signal has the enable level, and the second light emitting trigger signal has the enable level; and preferably, the first switching element is turned on in the $k^{th}$ frame and the $(k+1)^{th}$ frame, and the first switching element is turned off in the $(k+2)^{th}$ frame.

In one possible embodiment of the first aspect, in an $m^{th}$ frame, the first scan trigger signal has the enable level, and the first light emitting trigger signal remains at the non-enable level; the second scan trigger signal has the enable level, and the second light emitting trigger signal has the enable level, where the $m^{th}$ frame is located between the $k^{th}$ frame and the $(k+1)^{th}$ frame; and preferably, the first switching element is turned on in the $m^{th}$ frame.

In a second aspect, based on the same inventive concept, the embodiments of the present application further provide a display apparatus, including the display panel and a display driving chip as described in any of the embodiments of the first aspect.

In a third aspect, based on the same inventive concept, the embodiments of the present application further provide a display driving method used for driving the display panel as described in any of the embodiments of the first aspect;

The driving method includes:

providing a first trigger signal to the first gate driving circuit by the display driving chip;

providing a second trigger signal to the second gate driving circuit by the display driving chip;

driving the first display area by the first gate driving circuit; and driving the second display area by the second gate driving circuit.

According to the embodiments of the present application, compared to driving the first display area and the second display area using different display driving chips, the first display area and the second display area can share the same display driving chip through the data lines, first gate driving circuit, and second gate driving circuit of the present application, which can reduce the number of display driving chips and lower the cost of the display apparatus, thereby improving the process performance of the display product.

BRIEF DESCRIPTION OF THE DRAWINGS

Other features, objectives, and advantages of the present application will become more apparent by reading the following detailed descriptions of non-restrictive embodiments with reference to the drawings, where the same or similar reference numerals indicate the same or similar features, and the drawings are not drawn to actual scale.

DESCRIPTION OF REFERENCE NUMERALS

Figure 1:
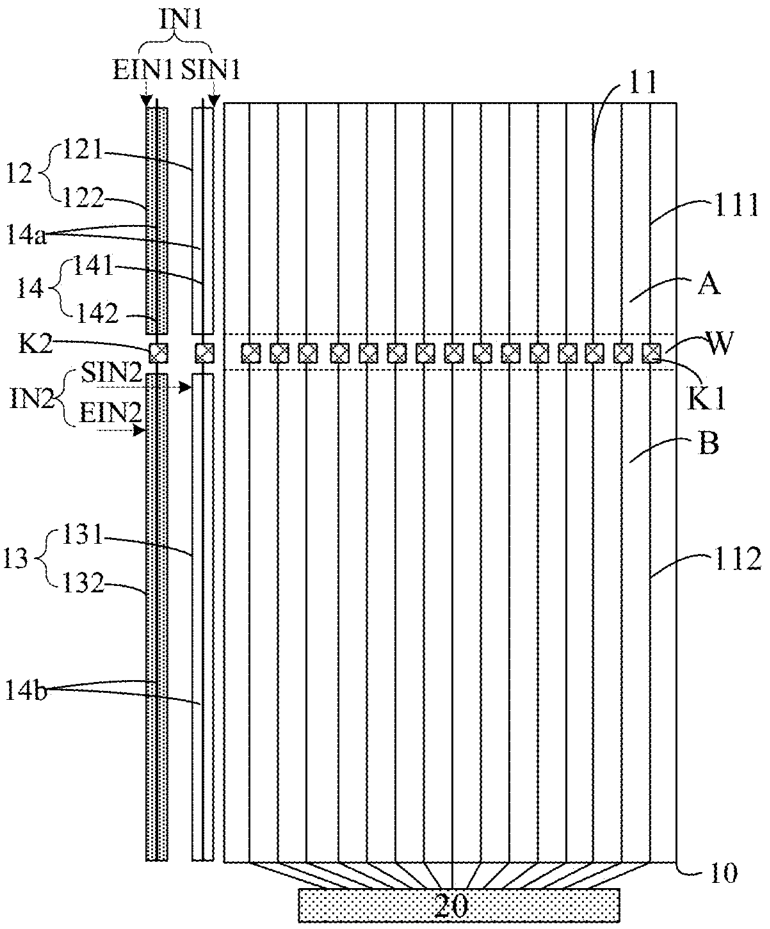
FIG. 1 illustrates a schematic structural diagram of a display panel provided by an embodiment of the present application.

10. Display panel;
11. Data line; 111. First segment; 112. Second segment;
K1. First switching element;
12. First gate driving circuit; IN1. First trigger signal;
121. First scan driving circuit; 122. First light emitting driving circuit;
SIN1. First scan trigger signal; EIN1. First light emitting trigger signal;
13. Second gate driving circuit; IN2. Second trigger signal;
131. Second scan driving circuit; 132. Second light emitting driving circuit;
SIN2. Second scan trigger signal; EIN2. Second light emitting trigger signal;
14. Clock signal line;
141. First clock signal line; 142. Second clock signal line;
20. Display driving chip.

DETAILED DESCRIPTION

Features and exemplary embodiments of various aspects of the present application will be described in detail below. In order to make the objectives, technical solutions, and advantages of the present application clearer, the present application will be further described in detail below with reference to the drawings and specific embodiments. It should be understood that the specific embodiments described herein are only configured to explain the present application, but not configured to limit the present application. For those skilled in the art, the present application can be implemented without some of these specific details. The following descriptions of the embodiments are merely to provide a better understanding of the present application by showing examples of the present application.

It should be noted that the relational terms herein, such as first and second, are merely used for distinguishing one entity or operation from another, and do not necessarily require or imply that any actual relationship or sequence exists between these entities or operations. Moreover, in the terms "include", "comprise", and any variants thereof are intended to cover a non-exclusive inclusion, so that a process, method, article, or device including a series of elements not only includes those elements, but also includes other elements not listed explicitly, or includes inherent elements of the process, method, article, or device. In the absence of more limitations, an element defined by "include a . . . " does not exclude other same elements existing in the process, method, article, or device including the element.

It should be understood that when the structure of a component is described and when one layer or area is referred to as located "on" or "above" other layer or area, the one layer or area may be directly located on the other layer or area, or other layers or areas may be included between the one layer or area and the other layer or area. In addition, if the component is flipped, the one layer or area will be located "below" or "under" the other layer or area.

It should be understood that in this specification, a term "and/or" is only an associative relationship for describing associated objects, indicating that three relationships may exist. For example, A and/or B may indicate three situations: A exists independently; A and B exist simultaneously; and B exists independently. In addition, a character "/" in this specification generally indicates an "or" relationship between contextually associated objects.

In the embodiments of the present application, the term "connection" may refer to direct connection between two components, or connection between two components via one or more other components.

It is obvious to those skilled in the art that various modifications and changes can be made in the present application without departing from the spirit or scope of the present application. Therefore, the present application is intended to cover the modifications and variations of the present application that fall within the scope of the corresponding claims (technical solutions to be protected) and equivalents thereof. It should be noted that the implementations provided in the embodiments of the present application can be combined with each other without contradiction.

The embodiments of the present application provide a display panel and a driving method thereof, and a display apparatus. The following will explain each embodiment of the present application in conjunction with the drawings.

As shown in FIG. 1, a display panel 10 provided in the embodiments of the present application includes a first display area A and a second display area B.

A display driving chip 20 may be used for driving the first display area A and the second display area B.

Both the first display area A and the second display area B may include sub-pixels distributed in an array (not shown), and the sub-pixels may include pixel circuits and light emitting elements.

Exemplarily, the display panel 10 may include a foldable display panel. For example, the area adjacent to the first display area A and the second display area B may be used as a bendable area. In a bent state, the first display area A and the second display area B may be opposite. In an unbent state, the first display area A and the second display area B may be used as a whole display screen. Exemplarily, the first display area A may be used as a secondary screen, and the second display area B may be used as a main screen.

Display scenarios of the first display area A and the second display area B may include but are not limited to: both the first display area A and the second display area B display; one of the first display area A and the second display area B displays, while the other does not display.

The display driving chip 20 can be used for driving the first display area A and the second display area B, which can be understood that driving signals for the first display area A and the second display area B come from the same display driving chip 20, for example, the driving signals include data signals.

Exemplarily, the display driving chip 20 may be disposed on a non-light-exiting surface of the display panel 10.

In the embodiments of the present application, compared to driving the first display area A and the second display area B using different display driving chips, the first display area A and the second display area B share the same display driving chip 20 to reduce the number of display driving chips and lower the cost of a display apparatus, thereby improving the process performance of the display product.

In some embodiments, as shown in FIG. 1, the display panel 10 includes data lines 11, where the data lines 11 run through the first display area A and the second display area B. The data lines 11 are connected to sub-pixels of the first display area A and the second display area B.

The data lines 11 are connected to the display driving chip 20, and the display driving chip 20 can provide data signals to the first display area A and/or the second display area B through the data lines 11. The display panel 10 may include a non-display area, the non-display area includes a binding area adjacent to the second display area B, and the display driving chip 20 may be bound to the binding area. The binding area below the second display area B can be bent towards the non-light-exiting surface of the display panel 10, so that the display driving chip 20 is located on the non-light-exiting surface of the display panel 10.

In the embodiments of the present application, compared with the situation that the first display area A and the second display area B are connected to different data lines respectively, using the same data line 11 to provide data signals to the first display area A and the second display area B can reduce the number of data lines, thereby being conducive to having high resolution and low cost of the display panel.

In some embodiments, still referring to FIG. 1, the data line 11 may include a first segment 111 and a second segment 112, the first segment 111 is located in the first display area A, the second segment 112 is located in the second display area B, and the first segment 111 and the second segment 112 are connected by a first switching element K1.

The first segment 111 is connected to the sub-pixels within the first display area A, and the first segment 111 is used for providing data signals to the first display area A. The second segment 112 is connected to the sub-pixels within the second display area B, and the second segment 112 is used for providing data signals to the second display area B.

The data line 11 and the first switching element K1 may be disposed in a one-to-one correspondence.

The first switching element K1 may include a transistor. The connection state between the first segment 111 and the second segment 112 can be controlled by controlling the state of the first switching element K1. When the first switching element K1 is turned on, the first segment 111 and the second segment 112 are connected. When the first switching element K1 is turned off, the first segment 111 and the second segment 112 are disconnected.

For example, when the first display area A does not need to display an image, the first switching element K1 can be controlled to turn off; or when the first display area A needs to display an image, the first switching element K1 can be controlled to turn on.

In the embodiments of the present application, the first switching element K1 facilitates flexible control on the connection state between the first segment 111 and the second segment 112 according to the display scenario, thereby improving the flexibility of the display apparatus to improve the usage performance of the display apparatus.

In some embodiments, still referring to FIG. 1, the display panel 10 may further include a bendable area W, and the first switching element K1 is located in the bendable area W.

Exemplarily, the bendable area W may be a display area, and the area adjacent to the first display area A and the second display area B may be used as the bendable area W.

Exemplarily, the bendable area W may be a non-display area, and the bendable area W is located between the first display area A and the second display area B.

Exemplarily, the at least one first switching element comprises a plurality of the first switching elements K1, and the first segment 111 and the second segment 112 of each data line 11 are connected by a corresponding one of the plurality of first switching elements K1.

In other examples, a plurality of data lines 11 may share one first switching element K1.

In some embodiments, still referring to FIG. 1, the display panel 10 further includes a first gate driving circuit 12 and a second gate driving circuit 13, the first gate driving circuit 12 is used for driving the first display area A, the second gate driving circuit 13 is used for driving the second display area B, the first gate driving circuit 12 receives a first trigger signal IN1, and the second gate driving circuit 13 receives a second trigger signal IN2.

The trigger signal may be used for controlling the working state of the gate driving circuit, or the trigger signal may be used for controlling the state of an output signal of the gate driving circuit.

When the trigger signal remains at a non-enable level, it can be considered that the gate driving circuit is not working or the gate driving circuit cannot output an enable level, so that the display area controlled by the gate driving circuit cannot display normally.

When the trigger signal includes an enable level, it can be considered that the gate driving circuit can work or the gate driving circuit can output an enable level, so that the display area controlled by the gate driving circuit can display.

In the embodiments of the present application, the first display area A and the second display area B are controlled by independent gate driving circuits and trigger signals, which facilitates separate control on the display of the first display area A and the second display area B.

In the present application, the data lines 11, the first gate driving circuit 12, and the second gate driving circuit 13 can be connected to the display driving chip 20, and the display driving chip 20 can be used for providing a first trigger signal to the first gate driving circuit 12 and a second trigger signal to the second gate driving circuit 13.

Both the first display area A and the second display area B may include sub-pixels, the sub-pixels include pixel circuits and light emitting elements, the pixel circuits may include driving transistors and switching transistors, and the signals output by the gate driving circuits can be used for controlling the state of the switching transistors.

Figure 2:
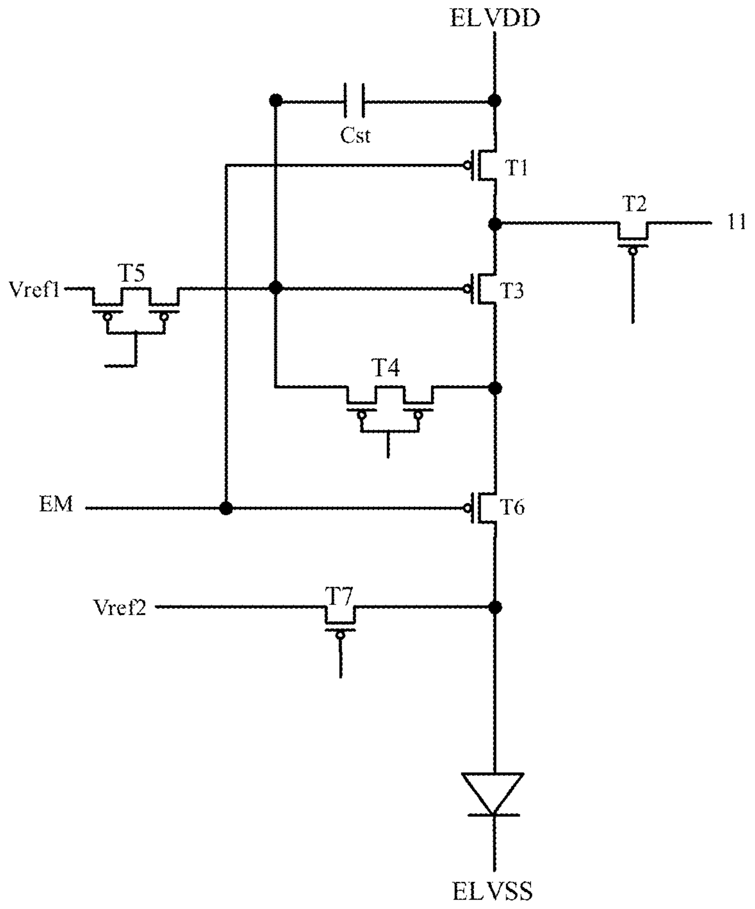
FIG. 2 illustrates a schematic structural diagram of a pixel circuit in the display panel provided by an embodiment of the present application.

As an example, as shown in FIG. 2, a pixel circuit may include transistors T1-T7 and a storage capacitor Cst, where T3 is a driving transistor and the other transistors are switching transistors. The transistors T1 and T6 may be used for controlling the pixel circuit to perform a light emitting stage and a non-light emitting stage. The transistor T2 is connected to the data line 11 to write data signals. The transistor T4 is a threshold compensation transistor. The transistor T5 receives a first reset signal Vref1 to reset a gate of the driving transistor T3 and the storage capacitor Cst. The transistor T7 receives a second reset signal Vref2 to reset an anode of a light emitting element.

It should be noted that the structure of the pixel circuit in the display apparatus provided in the embodiments of the present application may include, but is not limited to, the structure shown in FIG. 2.

In some embodiments, still referring to FIG. 2, the at least one first gate driving circuit 12 includes a first scan driving circuit 121 and a first light emitting driving circuit 122, the first trigger signal IN1 includes a first scan trigger signal SIN1 and a first light emitting trigger signal EIN1, the first scan driving circuit 121 receives the first scan trigger signal SIN1, and the first light emitting driving circuit 122 receives the first light emitting trigger signal EIN1.

When the first scan trigger signal SIN1 remains at a non-enable level, it can be considered that the first scan driving circuit 121 is not working or the first scan driving circuit 121 cannot output an enable level, so that the display area controlled by the first scan driving circuit 121 cannot display normally. For example, "the display area controlled by the first scan driving circuit 121 cannot display normally" may be "the data write transistor (T2 in FIG. 2) of the pixel circuit cannot be turned on", "the first reset transistor (T5 in FIG. 2) of the pixel circuit cannot be turned on", or "the second reset transistor (T7 in FIG. 2) of the pixel circuit cannot be turned on".

When the first scan trigger signal SIN1 includes an enable level, it can be considered that the first scan driving circuit 121 can work or the first scan driving circuit 121 can output an enable level, so that the display area controlled by the first scan driving circuit 121 can display. For example, "the display area controlled by the first scan driving circuit 121 can display" may be "the data write transistor (T2 in FIG. 2) of the pixel circuit can be turned on", "the first reset transistor (T5 in FIG. 2) of the pixel circuit can be turned on", or "the second reset transistor (T7 in FIG. 2) of the pixel circuit can be turned on".

Similarly, when the first light emitting trigger signal EIN1 remains at a non-enable level, it can be considered that the first light emitting driving circuit 122 is not working or the first light emitting driving circuit 122 cannot output an enable level, so that the display area controlled by the first light emitting driving circuit 122 cannot display normally. For example, "the display area controlled by the first light emitting driving circuit 122 cannot display normally" may be "the light emitting control transistors (T1 and T6 in FIG. 2) of the pixel circuit cannot be turned on".

When the first light emitting trigger signal EIN1 includes an enable level, it can be considered that the first light emitting driving circuit 122 can work or the first light emitting driving circuit 122 can output an enable level, so that the display area controlled by the first light emitting driving circuit 122 can display. For example, "the display area controlled by the first light emitting driving circuit 122 can display" may be "the light emitting control transistors (T1 and T6 in FIG. 2) of the pixel circuit can be turned on".

The first scan driving circuit 121 can be used for scanning the first display area A, and the first light emitting driving circuit 122 can be used for controlling the light emitting display of the first display area A. For example, referring to FIG. 1 and FIG. 2, the first scan driving circuit 121 may be connected to the gates of the transistors T2, T4, T5, and T7 in the first display area A, and the first light emitting driving circuit 122 may be connected to the gates of the transistors T1 and T5 in the first display area A.

In the embodiments of the present application, the first display area A is controlled by the independent scan driving circuit, light emitting driving circuit, scan trigger signal and light emitting trigger signal, which facilitate separate control on the scan and display of the first display area A.

In some embodiments, still referring to FIG. 1, the at least one second gate driving circuit 13 includes a second scan driving circuit 131 and a second light emitting driving circuit 132, the second trigger signal IN2 includes a second scan trigger signal SIN2 and a second light emitting trigger signal EIN2, the second scan driving circuit 131 receives the second scan trigger signal SIN2, and the second light emitting driving circuit 132 receives the second light emitting trigger signal EIN2.

The second scan driving circuit 131 can be used for scanning the second display area B, and the second light emitting driving circuit 132 can be used for controlling the light emitting display of the second display area B. For example, referring to FIG. 1 and FIG. 2, the second scan driving circuit 131 may be connected to the gates of the transistors T2, T4, T5, and T7 in the second display area B, and the second light emitting driving circuit 132 may be connected to the gates of the transistors T1 and T5 in the second display area B.

In the embodiments of the present application, the second display area B is controlled by the independent scan driving circuit, light emitting driving circuit, scan trigger signal and light emitting trigger signal, which facilitate separate control on the scan and display of the second display area B.

In some embodiments, as shown in FIG. 1, the display panel further includes at least one clock signal line, the first gate driving circuit 12 and a corresponding second gate driving circuit 13 may be connected to a same clock signal line 14.

The clock signal line 14 may be connected to a clock signal terminal of the display driving chip 20. The clock signal line 14 can be used for providing clock signals to the first gate driving circuit 12 and the second gate driving circuit 13.

In the embodiments of the present application, compared with the situation that the first gate driving circuit 12 and the second gate driving circuit 13 are connected to different clock signal lines respectively, using the same clock signal line to provide clock signals to the first gate driving circuit 12 and the second gate driving circuit 13 can reduce the number of clock signal lines, which is conducive to having high resolution and low cost of the display panel and can also reduce the border.

Exemplarily, as shown in FIG. 1, the display panel further includes at least one second switching element, the clock signal line 14 includes a third segment 14*a* and a fourth segment 14*b*, the first gate driving circuit 12 is connected to the third segment 14*a*, the second gate driving circuit 13 is connected to the fourth segment 14*b*, and the third segment 14*a* and the fourth segment 14*b* are connected by a second switching element K2.

For example, when the first gate driving circuit 12 does not need to work, the second switching element K2 can be turned off; or when the first gate driving circuit 12 needs to work, the second switching element K2 can be turned on.

In some embodiments, as shown in FIG. 1, the first gate driving circuit 12 includes a first scan driving circuit 121 and a first light emitting driving circuit 122, and the second gate driving circuit 13 includes a second scan driving circuit 131 and a second light emitting driving circuit 132. The first scan driving circuit 121 and the second scan driving circuit 131 are connected to a same first clock signal line 141, and the first light emitting driving circuit 122 and the second light emitting driving circuit 132 are connected to a same second clock signal line 142.

The first clock signal line 141 and the second clock signal line 142 may be connected to different clock signal terminals, and the clock signals transmitted by the first clock signal line 141 and the second clock signal line 142 may be different.

For example, the scan driving circuit and the light emitting driving circuit can be used for providing different gate driving signals with different refresh frequencies, different duty cycles, etc.

In the embodiments of the present application, the scan driving circuit and the light emitting driving circuit are connected to different clock signal lines, which facilitates control on the scan driving circuit and the light emitting driving circuit to provide different gate driving signals.

Figure 3:
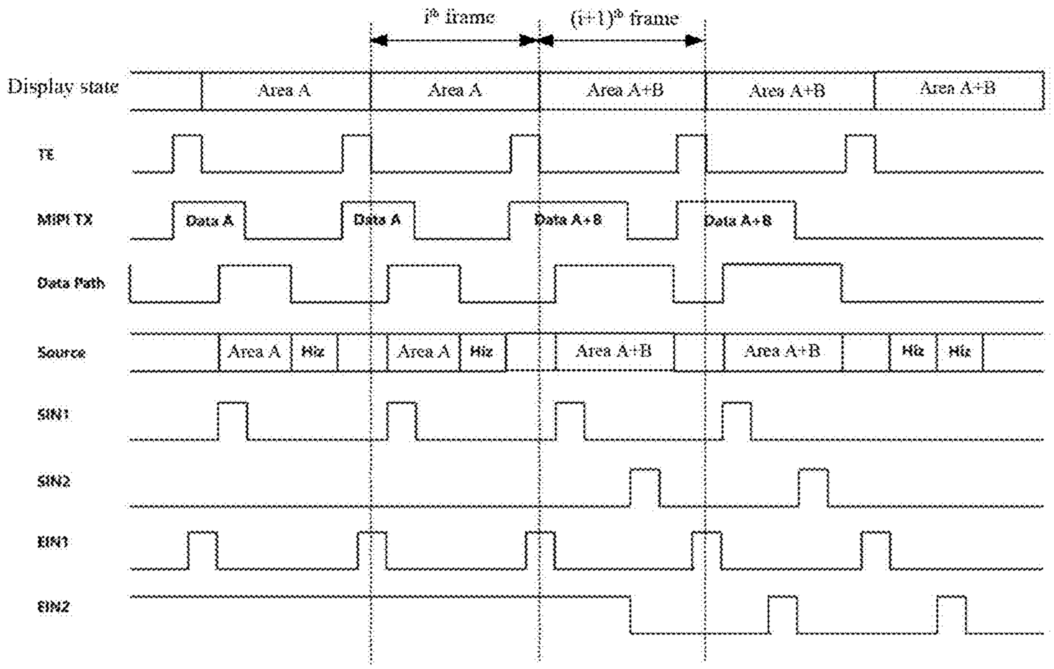
FIG. 3 illustrates a time series diagram of the display panel provided by an embodiment of the present application.

In some embodiments, as shown in FIG. 3, the display scenario of the display apparatus may include: switching from displaying only in the first display area A to displaying in the first display area A and the second display area B simultaneously.

For example, only the first display area A displays in an $i^{th}$ frame, and the first display area A and the second display area B display simultaneously in an $(i+1)^{th}$ frame. It can be understood that the $(i+1)^{th}$ frame is the next frame of the $i^{th}$ frame, and i is an integer greater than 0.

In this scenario, referring to FIG. 1 and FIG. 3, the display driving chip 20 can be used for:

in the $i^{th}$ frame, providing a data signal corresponding to an $i^{th}$ frame image to the first display area A, and providing no data signal to the second display area B, so as to control the first display area A to display the $i^{th}$ frame image and control the second display area B not to display any image; and in the $(i+1)^{th}$ frame, providing a data signal corresponding to an $(i+1)^{th}$ frame image to the first display area A, and starting providing the data signal corresponding to the $(i+1)^{th}$ frame image to the second display area B, so as to control the first display area A to display the $(i+1)^{th}$ frame image and control the second display area B to start switching from not displaying any image to displaying the $(i+1)^{th}$ frame image.

In the embodiments of the present application, the display driving chip switches from providing data signals to only the first display area A to providing data signals to both the first display area A and the second display area B, so that the display scenario switches from displaying only in the first display area A to displaying in the first display area A and the second display area B simultaneously, thereby completing the direct switching of the display scenario.

In some embodiments, when the display scenario switches from displaying only in the first display area A to displaying in the first display area A and the second display area B simultaneously, still referring to FIG. 1 and FIG. 3:

In the $i^{th}$ frame, the first scan trigger signal SIN1 has an enable level, and the first light emitting trigger signal EIN1 has an enable level; the second scan trigger signal SIN2 remains at a non-enable level, and the second light emitting trigger signal EIN2 remains at a non-enable level;

In the $(i+1)^{th}$ frame, the first scan trigger signal SIN1 has an enable level, and the first light emitting trigger signal EIN1 has an enable level; the second scan trigger signal SIN2 has an enable level, and the second light emitting trigger signal EIN2 has an enable level.

In the embodiments of the present application, in the $i^{th}$ frame, the signals SIN1 and EIN1 include enable levels and the signals SIN2 and EIN2 remain at non-enable levels, so that only the first display area A displays. In the $(i+1)^{th}$ frame, the signals SIN1, EIN1, SIN2, and EIN2 all include enable levels, so that the first display area A and the second display area B display simultaneously.

One of the enable level and the non-enable level is a high level, and the other is a low level. For example, the enable levels of the scan trigger signals SIN1 and SIN2 are high levels, and the non-enable levels are low levels; the enable levels of the light emitting trigger signals EIN1 and EIN2 are low levels, and the non-enable levels are high levels.

Notably, in the drawings of the present application, TE represents a clock synchronization signal of the display driving chip. MIPI Tx signal represents an instruction sent by a host controller of the display apparatus to the display driving chip, and the instruction can be used for instructing the switching of the display area of the display panel, for example, the instruction is used for instructing the display panel to switch from displaying only in the first display area A to displaying in the first display area A and the second display area B simultaneously. Optionally, in specific practice, the instruction may include several pieces of instruction information related to the switching area. Source represents the output of data signals by the display driving chip, where area A marked in the Source time series indicates that the display driving chip outputs data signals corresponding to the first display area A; area A+B marked in the Source time series indicates that the display driving chip outputs data signals corresponding to the first display area A and the second display area B; and Hiz marked in the Source time series indicates that the display driving chip does not output data signals to a display area. Data Path represents a data transmission path inside the display driving chip. In the Data Path time series, the narrow high-level pulse width indicates that the display driving chip outputs only data signals to the display area that needs to display (such as the first display area A or the second display area), the wide high-level pulse width indicates that the display driving chip outputs data signals to the first display area A and the second display area B, and symbol Black indicates that the display driving chip provides a black-state voltage to the display area that switches from a display state to a non-display state.

Understandably, when the application scenario switches from displaying only in the first display area A to displaying in the first display area A and the second display area B simultaneously, the Source and Data Path of the display driving chip can be directly switched according to the changes of Data information provided by MIPI TX. In addition, the trigger signal for controlling the first display area A and the second display area B changes from an action of only the SIN1 and EIN1 for controlling the first display area A to a simultaneous action of SIN1 and SIN2, EIN1 and EIN2. In the embodiments of the present application, the "action" may indicate that the provided trigger signal includes an enable level.

Figure 4:
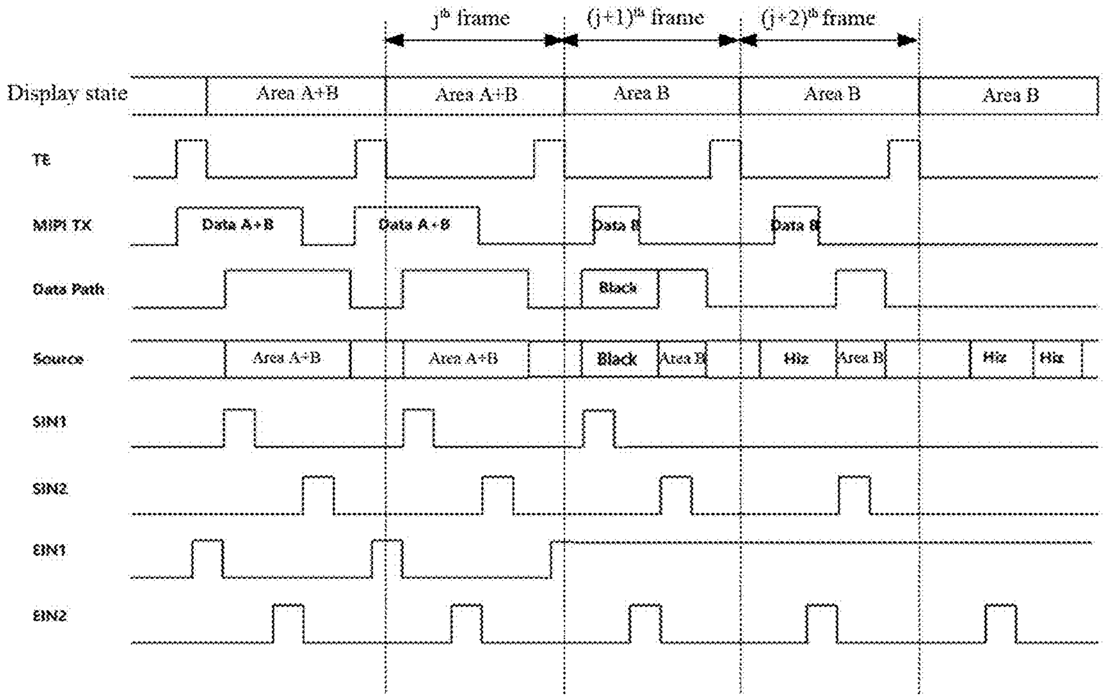
FIG. 4 illustrates another time series diagram of the display panel provided by an embodiment of the present application.

In some embodiments, as shown in FIG. 4, the display scenario of the display apparatus may include: switching from displaying in the first display area A and the second display area B simultaneously to displaying only in the second display area B.

For example, the first display area A and the second display area B display simultaneously in a $j^{th}$ frame, and only the second display area B displays after the $j^{th}$ frame. Understandably, a $(j+1)^{th}$ frame, a $(j+2)^{th}$ frame, etc. may follow the $j^{th}$ frame, where j is an integer greater than 0.

In this scenario, referring to FIG. 1 and FIG. 4, the display driving chip 20 can be used for:

in the $j^{th}$ frame, providing a data signal corresponding to the $j^{th}$ frame to the first display area A, and providing a data signal corresponding to the $j^{th}$ frame to the second display area B, so as to control the first display area A to display a $j^{th}$ frame image and control the second display area B to display the $j^{th}$ frame image;

in the $(j+1)^{th}$ frame, providing a black-state voltage Black indicating a black screen to the first display area A, and providing a data signal corresponding to the $(j+1)^{th}$ frame to the second display area B, so as to control the first display area A to display the black screen and control the second display area B to display the $j^{th}$ frame image; and in the $(j+2)^{th}$ frame, stopping providing data signals to the first display area A, and providing a data signal corresponding to the $(j+2)^{th}$ frame to the second display area B, so as to control the first display area A not to display any image and control the second display area B to display a $(j+2)^{th}$ frame image.

The $(j+1)^{th}$ frame can be understood as a transition frame where the first display area A begins to change.

In the embodiments of the present application, since the first display area A switches from displaying an image to not displaying any image, a transition frame is set in the switching process, and a black-state voltage Black indicating a black screen is provided to the first display area A in the transition frame, which can solve the problem of abnormal display caused by switching from displaying an image to not displaying any image in the first display area A.

In some embodiments, when the display scenario switches from displaying in the first display area A and the second display area B simultaneously to displaying only in the second display area B, still referring to FIG. 1 and FIG. 4:

In the $j^{th}$ frame, the first scan trigger signal SIN1 has an enable level, and the first light emitting trigger signal EIN1 has an enable level; the second scan trigger signal SIN2 has an enable level, and the second light emitting trigger signal EIN2 has an enable level;

In the $(j+1)^{th}$ frame, the first scan trigger signal SIN1 has an enable level, and the first light emitting trigger signal EIN1 remains at a non-enable level; the second scan trigger signal SIN2 has an enable level, and the second light emitting trigger signal EIN2 has an enable level;

In the $(j+2)^{th}$ frame, the first scan trigger signal SIN1 remains at a non-enable level, and the first light emitting trigger signal EIN1 remains at a non-enable level; the second scan trigger signal SIN2 has an enable level, and the second light emitting trigger signal EIN2 has an enable level.

In the embodiments of the present application, in the $(j+1)^{th}$ frame used for transition, the first scan trigger signal SIN1 includes an enable level, so that the black-state voltage Black used for indicating a black screen, provided by the display driving chip, can be written into the first display area A, and there is a transition state when the first display area A switches from the display state to the non-display state; and in the $(j+1)^{th}$ frame used for transition, the first light emitting trigger signal EIN1 remains at a non-enable level, which can further ensure that the first display area A can display a black screen.

Understandably, when the application scenario switches from displaying in the first display area A and the second display area B simultaneously to displaying only in the second display area B, the Source and Data Path of the display driving chip 20 change according to the Data information provided by MIPI TX. A transition frame with a black insertion in the first display area A and normal data in the second display area B is performed in the process. In addition, the trigger signal for controlling the first display area A and the second display area B changes from simultaneous action of SIN1 and SIN2, EIN1 and EIN2 to action of only SIN2 and EIN2 for controlling the second display area B. The transition frame then begins to change. In the embodiments of the present application, the "action" may indicate that the provided trigger signal includes an enable level.

Exemplarily, the first switching element K1 is turned on in the $j^{th}$ frame and the $(j+1)^{th}$ frame, and the first switching element K1 is turned off in the $(j+2)^{th}$ frame.

Figure 5:
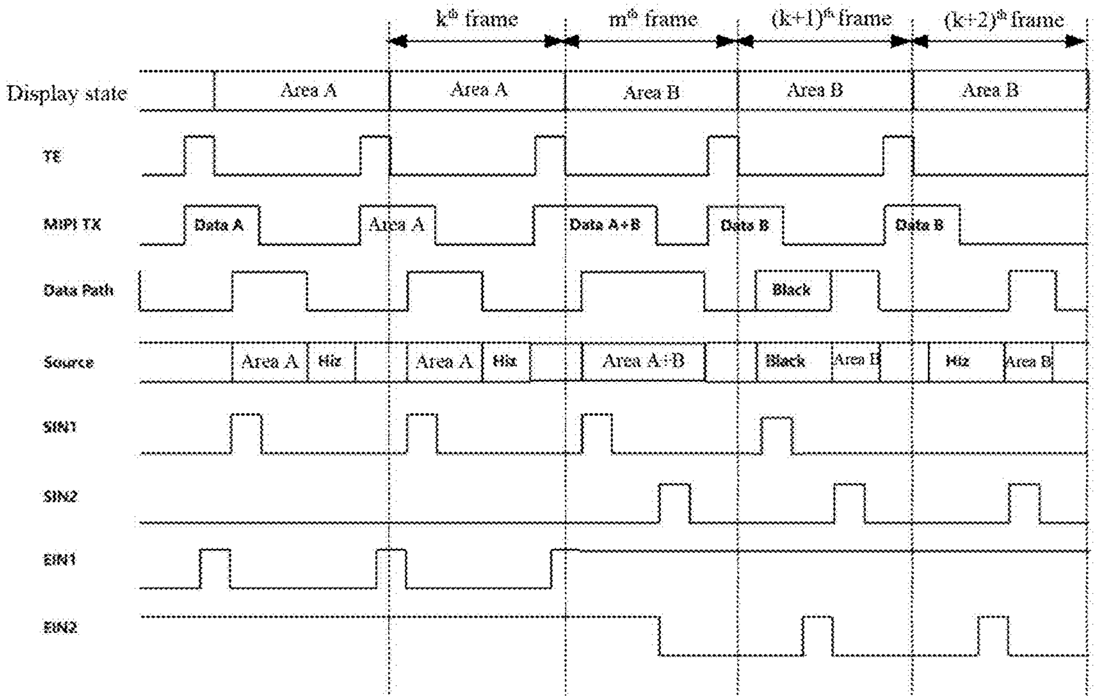
FIG. 5 illustrates still another time series diagram of the display panel provided by an embodiment of the present application.

In some embodiments, as shown in FIG. 5, the display scenario of the display apparatus may include: switching from displaying only in the first display area A to displaying only in the second display area B.

For example, only the first display area A displays in a $k^{th}$ frame, and only the second display area B displays after the $k^{th}$ frame. Understandably, a $(k+1)^{th}$ frame, a $(k+2)^{th}$ frame, etc. may follow the $k^{th}$ frame, where k is an integer greater than 0.

In this scenario, referring to FIG. 1 and FIG. 5, the display driving chip 20 can be used for:

in the $k^{th}$ frame, providing a data signal corresponding to the $k^{th}$ frame to the first display area A, and providing no data signal to the second display area B, so as to control the first display area A to display a $k^{th}$ frame image and control the second display area B not to display any image;

in the $(k+1)^{th}$ frame, providing a black-state voltage Black indicating a black screen to the first display area A, and providing a data signal corresponding to the $(k+1)^{th}$ frame to the second display area B, so as to control the first display area A to display the black screen and control the second display area B to display a $(k+1)^{th}$ frame image; and in the $(k+2)^{th}$ frame, stopping providing data signals to the first display area A, and providing a data signal corresponding to the $(k+2)^{th}$ frame to the second display area B, so as to control the first display area A not to display any image and control the second display area B to display a $(k+2)^{th}$ frame image.

The $(k+1)^{th}$ frame can be understood as a transition frame where the first display area A begins to change.

In the embodiments of the present application, since the first display area A switches from displaying an image to not displaying any image, a transition frame is set in the switching process, and a black-state voltage Black indicating a black screen is provided to the first display area A in the transition frame, which can solve the problem of abnormal display caused by switching from displaying an image to not displaying any image in the first display area A.

In some embodiments, when the display scenario switches from displaying only in the first display area A to displaying only in the second display area B, still referring to FIG. 1 and FIG. 5:

In the $k^{th}$ frame, the first scan trigger signal SIN1 has an enable level, and the first light emitting trigger signal EIN1 has an enable level; the second scan trigger signal SIN2 remains at a non-enable level, and the second light emitting trigger signal EIN2 remains at a non-enable level;

In the $(k+1)^{th}$ frame, the first scan trigger signal SIN1 has an enable level, and the first light emitting trigger signal EIN1 remains at a non-enable level; the second scan trigger signal SIN2 has an enable level, and the second light emitting trigger signal EIN2 has an enable level;

In the $(k+2)^{th}$ frame, the first scan trigger signal SIN1 remains at a non-enable level, and the first light emitting trigger signal EIN1 remains at a non-enable level; the second scan trigger signal SIN2 has an enable level, and the second light emitting trigger signal EIN2 has an enable level.

In the embodiments of the present application, in the $(k+1)^{th}$ frame used for transition, the first scan trigger signal SIN1 includes an enable level, so that the black-state voltage Black used for indicating a black screen, provided by the display driving chip, can be written into the first display area A; and in the $(k+1)^{th}$ frame used for transition, the first light emitting trigger signal EIN1 remains at a non-enable level, which enables the first display area A to display a black screen.

Understandably, when the application scenario switches from displaying only in the first display area A to displaying only in the second display area B, the Source and Data Path of the display driving chip 20 change according to the Data information provided by MIPI TX. A transition frame with a black insertion in the first display area A and normal data in the second display area B is required to be performed in the process. Meanwhile, the trigger signal for controlling the first display area A and the second display area B changes from an action of only SIN1 and EIN1 to an action of only SIN2 and EIN2 for controlling the second display area B. The transition frame then begins to change. In the embodiments of the present application, the "action" may indicate that the provided trigger signal includes an enable level.

Exemplarily, the first switching element K1 is turned on in the $k^{th}$ frame and the $(k+1)^{th}$ frame, and the first switching element K1 is turned off in the $(k+2)^{th}$ frame.

In some embodiments, as shown in FIG. 5, when the display scenario switches from displaying only in the first display area A to displaying only in the second display area B, a transition frame can be further set.

In this scenario, referring to FIG. 1 and FIG. 5, the display driving chip 20 can further be used for:

- in an $m^{th}$ frame, providing a data signal corresponding to the $m^{th}$ frame to the first display area A, and providing a data signal corresponding to the $m^{th}$ frame to the second display area B, so as to control the first display area A not to display any image and control the second display area B to display an $m^{th}$ frame image, where the $m^{th}$ frame is located between the $k^{th}$ frame and the $(k+1)^{th}$ frame.

In the embodiments of the present application, since the first display area A switches from displaying an image to not displaying any image, a $(k+1)^{th}$ transition frame is set in the switching process, a black-state voltage Black indicating a black screen is provided to the first display area A in the $(k+1)^{th}$ frame, the previous frame of the $(k+1)^{th}$ frame is further set as a transition frame, normal data signals are provided to both the first display area A and the second display area B in the $m^{th}$ frame, but the first display area A is controlled not to display, and the second display area B is controlled to display, which can solve the problem of abnormal display caused by switching from displaying an image to not displaying any image in the first display area A.

In some embodiments, when the display scenario switches from displaying only in the first display area A to displaying only in the second display area B, referring to FIG. 1 and FIG. 5:

In the $m^{th}$ frame, the first scan trigger signal SIN1 has an enable level, and the first light emitting trigger signal EIN1 remains at a non-enable level; the second scan trigger signal SIN2 has an enable level, and the second light emitting trigger signal EIN2 has an enable level.

In the embodiments of the present application, in the $m^{th}$ frame used for transition, the first scan trigger signal SIN1 includes an enable level, so that the data signal connected to the display driving chip can be written into the first display area A; and in the $m^{th}$ frame used for transition, the first light emitting trigger signal EIN1 remains at a non-enable level, so that the first display area A cannot display.

Exemplarily, the first switching element K1 is turned on in the $m^{th}$ frame.

Based on the same inventive concept, the embodiments of the present application further provide a display apparatus, including the display panel and a display driving chip as described in any of the above embodiments.

Based on the same inventive concept, the embodiments of the present application further provide a display driving method used for driving the display panel described in any of the above embodiments.

The display driving method provided in the embodiment of the present application includes:

- providing a first trigger signal to the first gate driving circuit by the display driving chip;
- providing a second trigger signal to the second gate driving circuit by the display driving chip;
- driving the first display area by first gate driving circuit; and
- driving the second display area by second gate driving circuit.

In the embodiments of the present application, compared to driving the first display area A and the second display area B using different display driving chips, the first display area A and the second display area B share the same display driving chip to reduce the number of display driving chips and lower the cost of the display apparatus, thereby improving the process performance of the display product.

It can be understood that the display apparatus provided in the embodiments of the present application may be other display apparatuses with display functions, such as a mobile phone, a computer, a television, or a vehicle-mounted display apparatus, which are not limited by the present application. The display apparatus provided in the embodiments of the present application has the beneficial effects of the display panel provided in the embodiments of the present application. For details, reference may be made to the specific description of the display panel in the above embodiments, which will not be repeated here in this embodiment.

It should be noted that the transistors in the embodiments of the present application may be N-type transistors or P-type transistors. For an N-type transistor, the turn-on level is a high level, and the cut-off level is a low level. That is, when the gate potential of the N-type transistor is at a high level, its first and second electrodes are turned on; and when the gate potential of the N-type transistor is a low level, its first and second electrodes are turned off. For a P-type transistor, the turn-on level is a low level, and the cut-off level is a high level. That is, when the gate potential of the P-type transistor is at a low level, its first and second electrodes are turned on; and when the gate potential of the P-type transistor is a high level, its first and second electrodes are turned off. In specific implementation, the gate electrode of each transistor described above serves as its control electrode, and according to the signal for the gate electrode of each transistor and its type, its first electrode may serve as a source electrode, and its second electrode may serve as a drain electrode, or its first electrode may serve as a drain electrode, and its second electrode may serve as a source electrode, which are not distinguished here. In addition, the turn-on level and the turn-off level in the embodiments of the present application are general terms, where the turn-on level refers to any level that can turn on the transistor, and the cut-off level refers to any level that can cut off/turn off the transistor.

In at least a part of an $i^{th}$ frame, the first scan trigger signal has an enable level, and the first light emitting trigger signal has the enable level; in the $i^{th}$ frame, the second scan trigger signal remains at a non-enable level, and the second light emitting trigger signal remains at the non-enable level;

in at least a part of an $(i+1)^{th}$ frame, the first scan trigger signal has the enable level, the first light emitting trigger signal has the enable level, the second scan trigger signal has the enable level, and the second light emitting trigger signal has the enable level.

In at least a part of a $j^{th}$ frame, the first scan trigger signal has an enable level, and the first light emitting trigger signal has the enable level, the second scan trigger signal has the enable level, and the second light emitting trigger signal has the enable level;

in at least a part of a $(j+1)^{th}$ frame, the first scan trigger signal has the enable level, the second scan trigger signal has the enable level, and the second light emitting trigger signal has the enable level; in the $(j+1)^{th}$ frame, the first light emitting trigger signal remains at a non-enable level;

in a $(j+2)^{th}$ frame, the first scan trigger signal remains at the non-enable level, and the first light emitting trigger signal remains at the non-enable level; in at least a part of the $(j+2)^{th}$ frame, the second scan trigger signal has the enable level, and the second light emitting trigger signal has the enable level.

In at least a part of a $k^{th}$ frame, the first scan trigger signal has an enable level, and the first light emitting trigger signal has the enable level; in the $k^{th}$ frame, the second scan trigger signal remains at a non-enable level, and the second light emitting trigger signal remains at the non-enable level;

in at least a part of a $(k+1)^{th}$ frame, the first scan trigger signal has the enable level, the second scan trigger signal has the enable level, and the second light emitting trigger signal has the enable level; in the $(k+1)^{th}$ frame, the first light emitting trigger signal remains at the non-enable level;

in a $(k+2)^{th}$ frame, the first scan trigger signal remains at the non-enable level, and the first light emitting trigger signal remains at the non-enable level; in at least a part of the $(k+2)^{th}$ frame, the second scan trigger signal has the enable level, and the second light emitting trigger signal has the enable level.

It should also be noted that the exemplary embodiments mentioned in the present application describe some methods or systems based on a series of steps or devices. However, the present application is not limited to the order of the above steps, that is, the steps may be performed in the order mentioned in the embodiments or in an order different from that in the embodiments, or several steps may be performed simultaneously.

The above describes various aspects of the present application with reference to the flowchart and/or block diagram of the method, apparatus (system), and computer program product according to the embodiments of the present application. It should be understood that each box in the flowchart and/or block diagram and a combination of boxes in the flowchart and/or block diagram can be implemented by computer program instructions. These computer program instructions can be provided to a processor of a general-purpose computer, a dedicated computer, or other programmable data processing apparatuses to produce a machine, which enables the instructions executed by the processor of the computer or other programmable data processing apparatuses to implement the functions/actions specified in one or more boxes of the flowchart and/or block diagram. Such a processor may be, but is not limited to a general-purpose processor, a dedicated processor, a special application processor, or a field programmable logic circuit. It can also be understood that each box in the block diagram and/or flowchart and a combination of boxes in the block diagram and/or flowchart can be implemented by dedicated hardware that executes specified functions or actions, or by a combination of dedicated hardware and computer instructions.

According to the embodiments described above in the present application, these embodiments do not provide a detailed description of all the details, nor do they limit the present application to only the described specific embodiments. Apparently, many modifications and changes may be made to the above description. This specification selects and specifically describes these embodiments in order to better explain the principles and practical applications of the present application, so that those skilled in the art can make good use of the present application and modifications based on the present application. The present application is merely limited by the claims and all their scope and equivalents.

What is claimed is:

1. A display panel, comprising:

a first display area and a second display area;

a plurality of data lines running through the first display area and the second display area, each of the plurality of data lines comprising a first segment and a second segment, the first segment being located in the first display area, the second segment being located in the second display area;

at least one first switching element, the first segment and the second segment being connected by the first switching element; and at least one first gate driving circuit and at least one second gate driving circuit, the first gate driving circuit being configured to drive the first display area, the second gate driving circuit being configured to drive the second display area, the first gate driving circuit receiving a first trigger signal, and the second gate driving circuit receiving a second trigger signal;

wherein the plurality of data lines, the first gate driving circuit, and the second gate driving circuit are configured to be connected to a display driving chip, and the display driving chip is configured to provide the first trigger signal to the first gate driving circuit and provide the second trigger signal to the second gate driving circuit;

wherein the at least one first gate driving circuit comprises a first scan driving circuit and a first light emitting driving circuit, the first trigger signal comprises a first scan trigger signal and a first light emitting trigger signal, the first scan driving circuit receives the first scan trigger signal, and the first light emitting driving circuit receives the first light emitting trigger signal;

wherein the at least one second gate driving circuit comprises a second scan driving circuit and a second light emitting driving circuit, the second trigger signal comprises a second scan trigger signal and a second light emitting trigger signal, the second scan driving circuit receives the second scan trigger signal, and the second light emitting driving circuit receives the second light emitting trigger signal; and wherein:

in at least a part of a $j^{th}$ frame, the first scan trigger signal has an enable level, and the first light emitting trigger signal has the enable level, the second scan trigger signal has the enable level, and the second light emitting trigger signal has the enable level;

in at least a part of a $(j+1)^{th}$ frame, the first scan trigger signal has the enable level, the second scan trigger signal has the enable level, and the second light emitting trigger signal has the enable level; in the $(j+1)^{th}$ frame, the first light emitting trigger signal remains at a non-enable level;

in a $(j+2)^{th}$ frame, the first scan trigger signal remains at the non-enable level, and the first light emitting trigger signal remains at the non-enable level; in at least a part of the $(j+2)^{th}$ frame, the second scan trigger signal has the enable level, and the second light emitting trigger signal has the enable level.

2. The display panel according to claim 1, wherein the display panel further comprises a bendable area, and the first switching element is located in the bendable area; the bendable area is located between the first display area and the second display area.

3. The display panel according to claim 1, wherein the at least one first switching element comprises a plurality of first switching elements, and the first segment and the second segment of each of the data lines are connected by a corresponding one of the plurality of first switching elements.

4. The display panel according to claim 1, wherein at least two data lines share the first switching element.

5. The display panel according to claim 1, wherein the first switching element comprises a transistor.

6. The display panel according to claim 1, further comprising at least one clock signal line, wherein the first gate driving circuit and a corresponding second gate driving circuit are connected to a same clock signal line.

7. The display panel according to claim 6, further comprising at least one second switching element, wherein the clock signal line comprises a third segment and a fourth segment, the first gate driving circuit is connected to the third segment, the second gate driving circuit is connected to the fourth segment, and the third segment and the fourth segment are connected by the second switching element.

8. The display panel according to claim 1, further comprising a plurality of clock signal lines comprising a first clock signal line and a second clock signal line, wherein the first scan driving circuit and the second scan driving circuit are connected to the first clock signal line, and the first light emitting driving circuit and the second light emitting driving circuit are connected to the second clock signal line.

9. The display panel according to claim 1, wherein in at least a part of an $i^{th}$ frame, the first scan trigger signal has an enable level, and the first light emitting trigger signal has the enable level; in the $i^{th}$ frame, the second scan trigger signal remains at a non-enable level, and the second light emitting trigger signal remains at the non-enable level;

in at least a part of an $(i+1)^{th}$ frame, the first scan trigger signal has the enable level, the first light emitting trigger signal has the enable level, the second scan trigger signal has the enable level, and the second light emitting trigger signal has the enable level.

10. The display panel according to claim 9, wherein the first switching element is turned on in the $i^{th}$ frame and the $(i+1)^{th}$ frame.

11. The display panel according to claim 1, wherein the first switching element is turned on in the $j^{th}$ frame and the $(j+1)^{th}$ frame, and the first switching element is turned off in the $(j+2)^{th}$ frame.

12. A display apparatus, comprising the display panel and the display driving chip according to claim 1.

13. A display panel, comprising:

a first display area and a second display area;

a plurality of data lines running through the first display area and the second display area, each of the plurality of data lines comprising a first segment and a second segment, the first segment being located in the first display area, the second segment being located in the second display area;

at least one first switching element, the first segment and the second segment being connected by the first switching element; and at least one first gate driving circuit and at least one second gate driving circuit, the first gate driving circuit being configured to drive the first display area, the second gate driving circuit being configured to drive the second display area, the first gate driving circuit receiving a first trigger signal, and the second gate driving circuit receiving a second trigger signal;

wherein the plurality of data lines, the first gate driving circuit, and the second gate driving circuit are configured to be connected to a display driving chip, and the display driving chip is configured to provide the first trigger signal to the first gate driving circuit and provide the second trigger signal to the second gate driving circuit;

wherein the at least one first gate driving circuit comprises a first scan driving circuit and a first light emitting driving circuit, the first trigger signal comprises a first scan trigger signal and a first light emitting trigger signal, the first scan driving circuit receives the first scan trigger signal, and the first light emitting driving circuit receives the first light emitting trigger signal;

wherein the at least one second gate driving circuit comprises a second scan driving circuit and a second light emitting driving circuit, the second trigger signal comprises a second scan trigger signal and a second light emitting trigger signal, the second scan driving circuit receives the second scan trigger signal, and the second light emitting driving circuit receives the second light emitting trigger signal; and wherein:

in at least a part of a $k^{th}$ frame, the first scan trigger signal has an enable level, and the first light emitting trigger signal has the enable level; in the $k^{th}$ frame, the second scan trigger signal remains at a non-enable level, and the second light emitting trigger signal remains at the non-enable level;

in at least a part of a $(k+1)^{th}$ frame, the first scan trigger signal has the enable level, the second scan trigger signal has the enable level, and the second light emitting trigger signal has the enable level; in the $(k+1)^{th}$ frame, the first light emitting trigger signal remains at the non-enable level; and in a $(k+2)^{th}$ frame, the first scan trigger signal remains at the non-enable level, and the first light emitting trigger signal remains at the non-enable level; in at least a part of the $(k+2)^{th}$ frame, the second scan trigger signal has the enable level, and the second light emitting trigger signal has the enable level.

14. The display panel according to claim 13, wherein the first switching element is turned on in the $k^{th}$ frame and the $(k+1)^{th}$ frame, and the first switching element is turned off in the $(k+2)^{th}$ frame.

15. The display panel according to claim 13, wherein in at least a part of an $m^{th}$ frame, the first scan trigger signal has the enable level, the second scan trigger signal has the enable level, and the second light emitting trigger signal has the enable level; in the $m^{th}$ frame, the first light emitting trigger signal remains at the non-enable level; wherein the $m^{th}$ frame is located between the $k^{th}$ frame and the $(k+1)^{th}$ frame.

16. The display panel according to claim 15, wherein the first switching element is turned on in the $m^{th}$ frame.

17. The display panel according to claim 13, wherein the display panel further comprises a bendable area, and the first switching element is located in the bendable area; the bendable area is located between the first display area and the second display area.

18. The display panel according to claim 13, wherein the at least one first switching element comprises a plurality of first switching elements, and the first segment and the second segment of each of the data lines are connected by a corresponding one of the plurality of first switching elements.

19. The display panel according to claim 13, wherein at least two data lines share the first switching element.

20. The display panel according to claim 13, wherein the first switching element comprises a transistor.

* * * * *